US011149898B1

(12) United States Patent
Perez

(10) Patent No.: US 11,149,898 B1
(45) Date of Patent: Oct. 19, 2021

(54) PORTABLE GAME STAND ASSEMBLY

(71) Applicant: Wallace Perez, Flaxville, MT (US)

(72) Inventor: Wallace Perez, Flaxville, MT (US)

( * ) Notice: Subject to any disclaimer, the term of this patent is extended or adjusted under 35 U.S.C. 154(b) by 0 days.

(21) Appl. No.: 17/143,479

(22) Filed: Jan. 7, 2021

(51) Int. Cl.
*F16M 11/16* (2006.01)
*F16M 11/04* (2006.01)
*F16M 11/28* (2006.01)

(52) U.S. Cl.
CPC ........... *F16M 11/16* (2013.01); *F16M 11/046* (2013.01); *F16M 11/28* (2013.01); *F16M 2200/028* (2013.01)

(58) Field of Classification Search
CPC ...... F16M 11/16; F16M 11/046; F16M 11/28; F16M 2200/028; A22C 21/0046; A22B 5/06; A22B 7/002; A01G 9/122; A45F 3/44; E04H 12/2215
USPC ......... 248/127, 156, 530; 452/194, 188–192, 452/187, 185
See application file for complete search history.

(56) References Cited

U.S. PATENT DOCUMENTS

| 2,075,006 | A | | 3/1937 | Braun | |
|---|---|---|---|---|---|
| 3,016,802 | A | | 1/1962 | Grunenberg | |
| 4,402,166 | A | * | 9/1983 | Wortham, Jr. | ........ E04H 12/223 248/156 |
| 5,556,064 | A | * | 9/1996 | Cowe | ..................... F16M 11/24 248/172 |
| 7,874,531 | B1 | * | 1/2011 | Walden | .................... A22B 5/06 248/176.1 |
| 7,922,568 | B1 | * | 4/2011 | Byrd | ........................ A22B 5/06 452/197 |
| 8,336,855 | B2 | * | 12/2012 | Griffiths | ..................... B44C 5/02 254/1 |
| 9,097,481 | B2 | | 8/2015 | Chaney | |
| 9,556,999 | B2 | | 1/2017 | Niemerg | |
| 9,972,221 | B2 | | 5/2018 | Raby | |
| 10,118,437 | B1 | | 11/2018 | Weaver | |
| 10,400,950 | B1 | | 9/2019 | Hauser | |
| 10,718,465 | B2 | | 7/2020 | Wall | |
| 2004/0225319 | A1 | * | 11/2004 | Konyn | ..................... A22B 5/06 606/198 |
| 2006/0144246 | A1 | * | 7/2006 | Holliday | ............. A47J 37/1271 99/403 |
| 2007/0254581 | A1 | * | 11/2007 | Hoffmann | ................ A22B 5/06 452/187 |
| 2009/0121095 | A1 | * | 5/2009 | Eighmie | ............. F16M 11/046 248/132 |

(Continued)

FOREIGN PATENT DOCUMENTS

EP 2455698 10/2011

*Primary Examiner* — Christopher Garft

(57) ABSTRACT

A portable game stand assembly includes a base that is positionable on a horizontal support surface. A receiver is coupled to and extends upwardly from the base and a sleeve is insertable into the receiver. A yoke is insertable into the sleeve thereby facilitating the yoke to be vertically oriented when the base is positioned on the horizontal support surface. In this way a neck of a game animal can be positioned in the yoke thereby facilitating the game animal's head to be positioned in a preferred orientation for taxidermy. A pair of adjustable rods is provided and each of the adjustable rods has a slidably adjustable length. Moreover, each of the adjustable rods can be positioned against the game animal for propping the game animal in a preferred orientation.

12 Claims, 5 Drawing Sheets

(56) References Cited

U.S. PATENT DOCUMENTS

| | | | |
|---|---|---|---|
| 2010/0044655 A1* | 2/2010 | Griffiths | B44C 5/02 |
| | | | 254/1 |
| 2011/0006172 A1* | 1/2011 | Sargent | A61D 3/00 |
| | | | 248/156 |
| 2011/0006173 A1* | 1/2011 | Sargent | A01M 31/00 |
| | | | 248/156 |
| 2012/0178352 A1* | 7/2012 | Watson | A22B 7/006 |
| | | | 452/187 |
| 2016/0243887 A1 | 8/2016 | Brewer | |

* cited by examiner

PORTABLE GAME STAND ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to portable stand devices and more particularly pertains to a new portable stand device for supporting a game animal for taxidermy. The stand device includes a base, a sleeve and a yoke that is slidably adjustable in the sleeve. The base, sleeve and yoke can be broken down or assembled thereby facilitating storage and transportation.

(2) Description of Related Art Including Information Disclosed Under 37 CFR 1.97 and 1.98

The prior art relates to portable stand devices including a variety of tripod stands for supporting a firearm. The prior art also discloses a variety of hunting trophy stands for displaying a hunting trophy. Additionally, the prior art discloses a taxidermy stand that includes a universal joint for adjusting the position on the taxidermy stand. In no instance does the prior art disclose a taxidermy stand that includes a yoke.

BRIEF SUMMARY OF THE INVENTION

An embodiment of the disclosure meets the needs presented above by generally comprising a base that is positionable on a horizontal support surface. A receiver is coupled to and extends upwardly from the base and a sleeve is insertable into the receiver. A yoke is insertable into the sleeve thereby facilitating the yoke to be vertically oriented when the base is positioned on the horizontal support surface. In this way a neck of a game animal can be positioned in the yoke thereby facilitating the game animal's head to be positioned in a preferred orientation for taxidermy. A pair of adjustable rods is provided and each of the adjustable rods has a slidably adjustable length. Moreover, each of the adjustable rods can be positioned against the game animal for propping the game animal in a preferred orientation.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
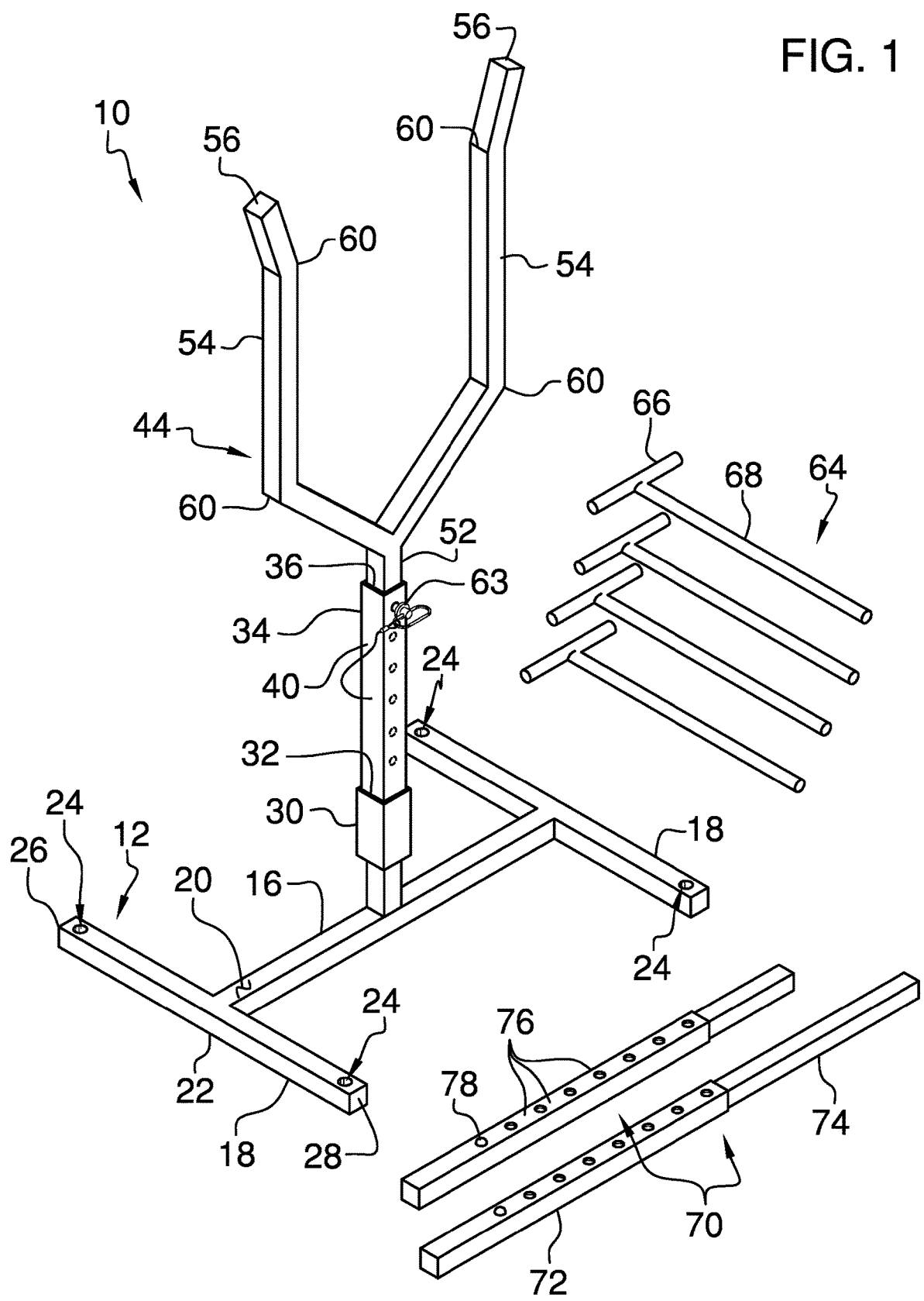
FIG. 1 is a perspective view of a portable game stand assembly according to an embodiment of the disclosure.
Figure 2:
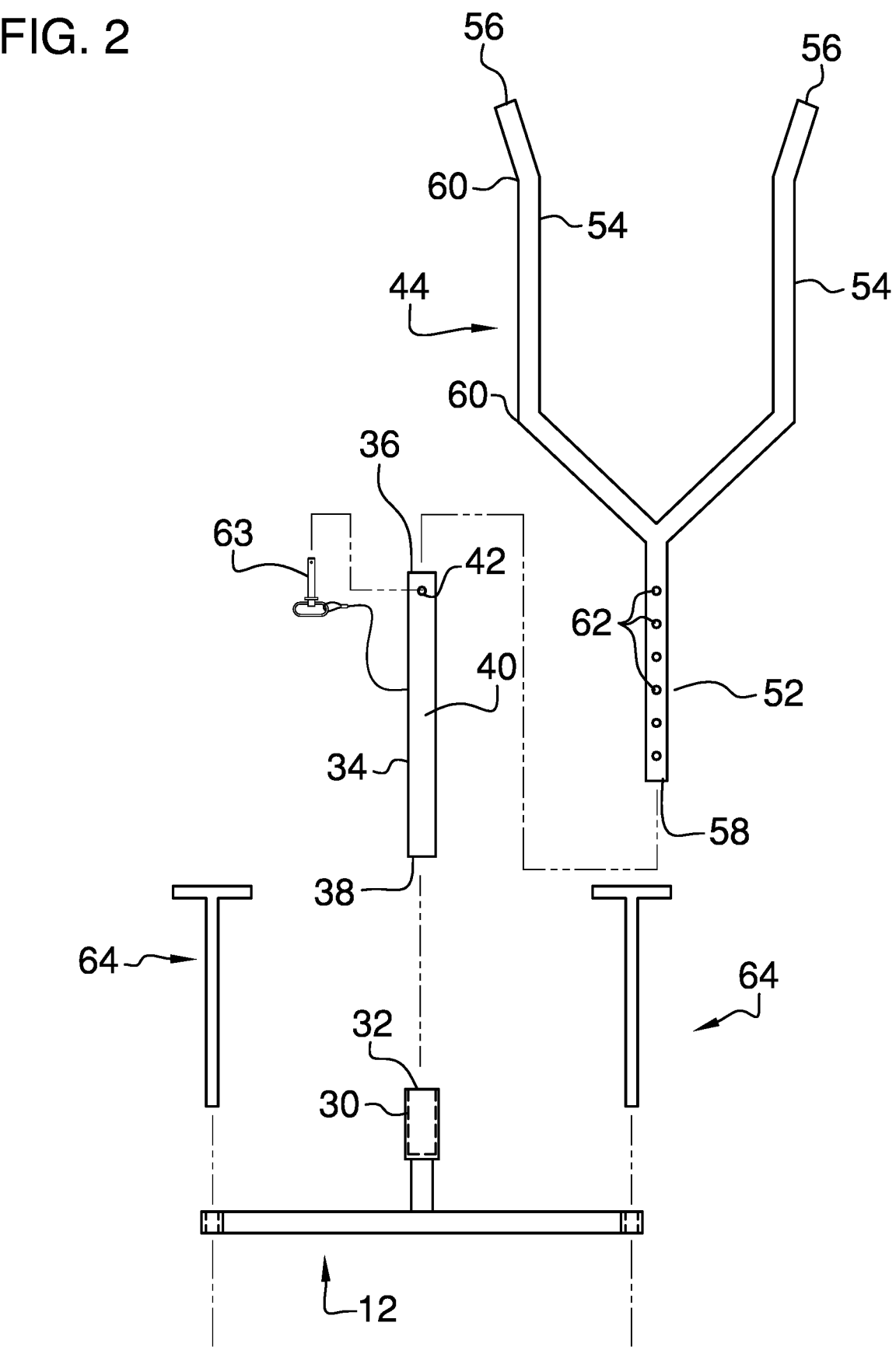
FIG. 2 is a front exploded view of an embodiment of the disclosure.
Figure 3:
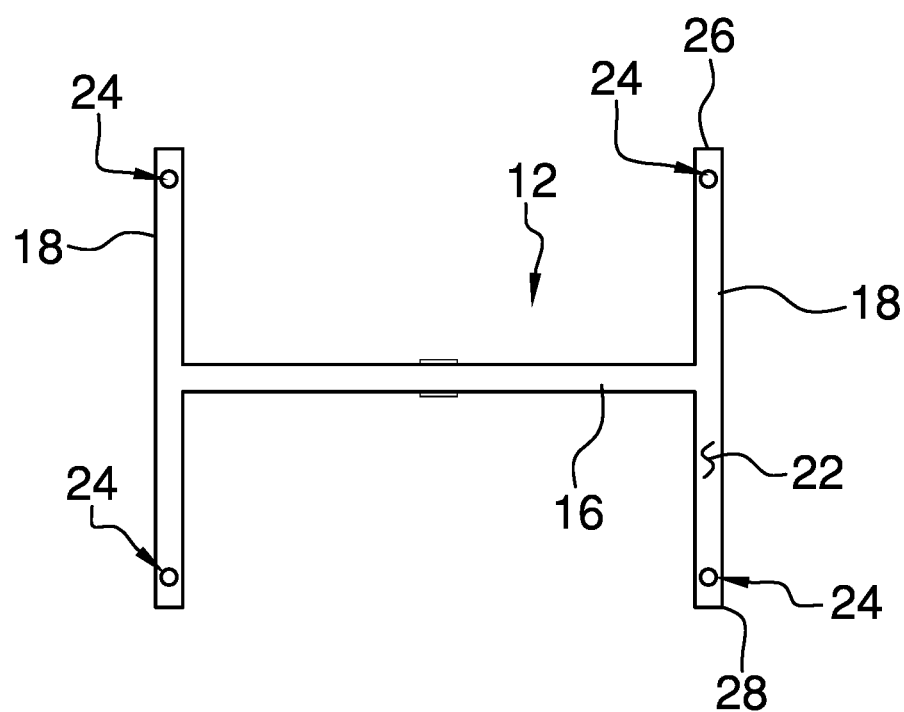
FIG. 3 is a bottom view of a base of an embodiment of the disclosure.
Figure 4:
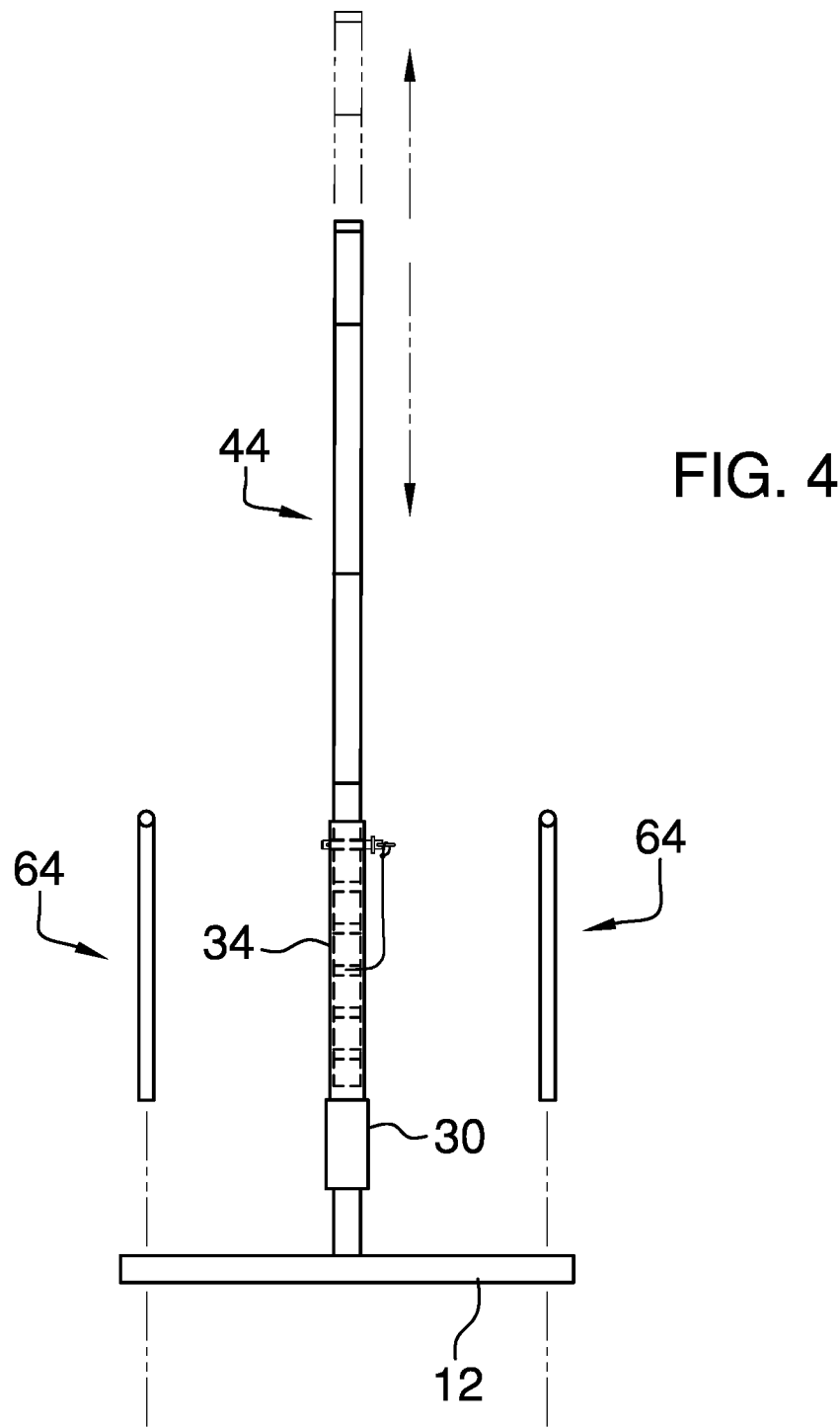
FIG. 4 is a right side exploded view of an embodiment of the disclosure.
Figure 5:
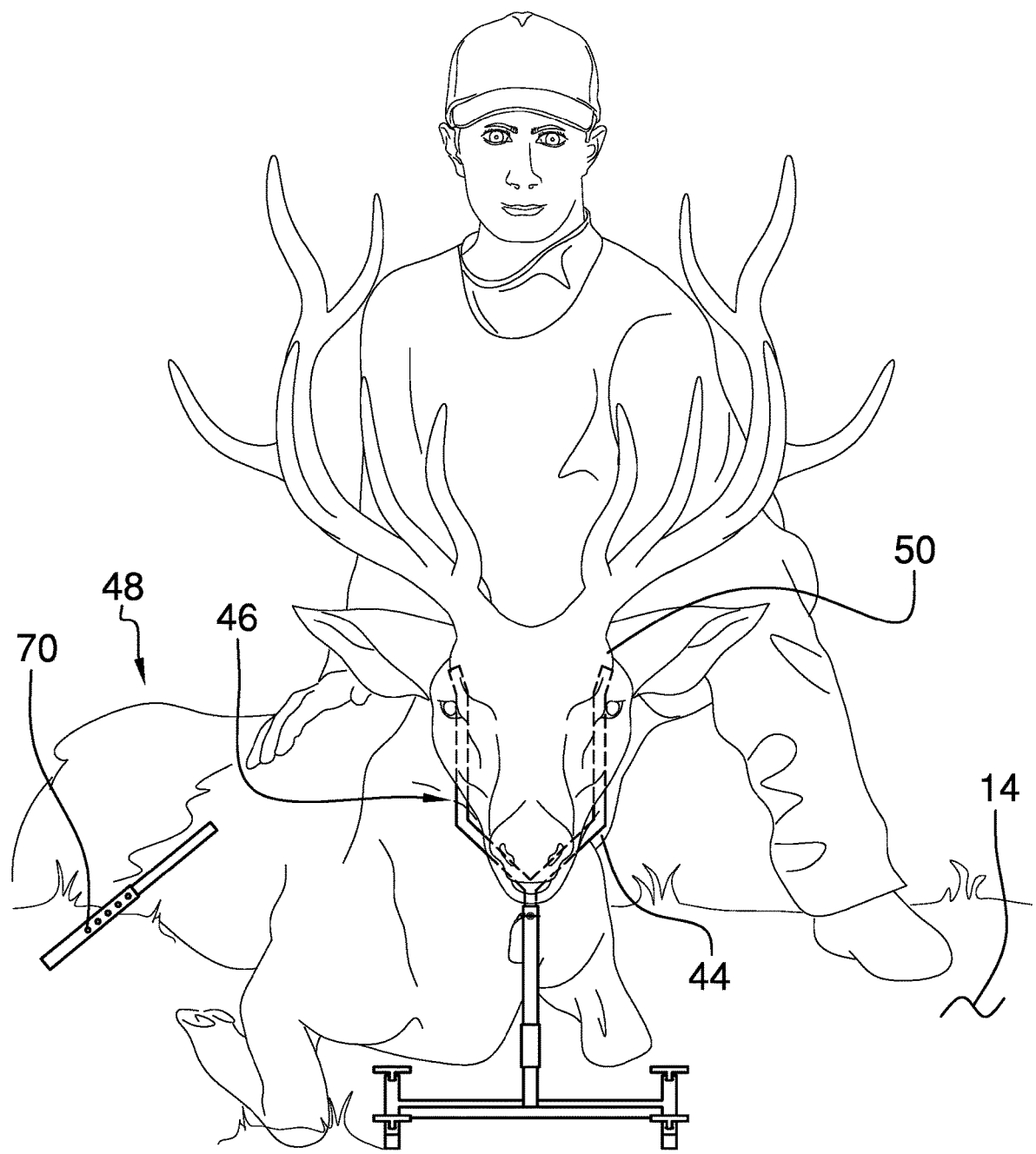
FIG. 5 is a perspective in-use view of an embodiment of the disclosure.

With reference now to the drawings, and in particular to FIGS. 1 through 5 thereof, a new portable stand device embodying the principles and concepts of an embodiment of the disclosure and generally designated by the reference numeral 10 will be described.

As best illustrated in FIGS. 1 through 5, the portable game stand assembly 10 generally comprises a base 12 that is positionable on a horizontal support surface 14, such as the ground or the like. The base 12 comprises a central member 16 extending between a pair of outward members 18. The central member 16 is oriented perpendicular to each of the outward members 18 and the central member 16 is centrally positioned along each of the outward members 18. Each of the outward members 18 and the central member 16 has a top surface 20 and a bottom surface 22, and each of the outward members 18 has a pair of holes 24 each extending through the top surface 20 and the bottom surface 22 of the outward members 18. Each of the holes 24 is positioned adjacent to a respective one of a first end 26 and a second end 28 of a respective one of the outward members 18.

A receiver 30 is provided and the receiver 30 is coupled to and extends upwardly from the base 12. The receiver 30 is positioned on the top surface 20 of the central member 16 and the receiver 30 is centrally positioned on the central member 16. Additionally, the receiver 30 has a distal end 32 with respect to the top surface 20 and the distal end 32 is open. A sleeve 34 is provided and the sleeve 34 is insertable into the receiver 30. The sleeve 34 has a first end 36, a second end 38 and an outer wall 40 extending therebetween, and the outer wall 40 has an aperture 42 extending through the outer wall. The aperture 42 is positioned adjacent to the first end 36 and the second end 38 is insertable into the distal end 32 of the receiver 30 having the sleeve 34 being vertically oriented.

A yoke 44 is insertable into the sleeve 34 thereby facilitating the yoke 44 to be vertically oriented when the base 12 is positioned on the horizontal support surface 14. In this way the yoke 44 can have a neck 46 of a game animal 48 positioned therein thereby facilitating the game animal's head 50 to be positioned in a preferred orientation for taxidermy. Thus, a hunter or taxidermist can perform taxidermy on the game animal 48 in a location that does not have taxidermy equipment available. The yoke 44 has a first member 52 and a pair of second members 54 each forking away from the first member 52. Each of the second members 54 has a distal end 56 with respect to the first member 52 and the first member 52 has a distal end 58 with respect to each of the second members 54. Each of the second members 54 has a sequence of bends 60 thereon that is distributed between the first member 52 and the distal end 56 of the second members 54 such that the yoke 44 has a Y-shape.

The first member 52 has a plurality of holes 62 each extending through the first member 52. The holes 62 in the first member 52 are spaced apart from each other and are distributed between the pair of second members 54 and the distal end 58 of the first member 52. The first member 52 is insertable into the first end 36 of the sleeve 34 and the yoke 44 is positionable to align a respective one of the holes 62 with the aperture 42 in the outer wall 40 of the sleeve 34. In this way the height of the yoke 44 can be adjusted to accommodate a variety of sizes of game animals. A pin 63 is insertable through the sleeve 34 and engages the yoke 44 to retain the yoke 44 at a selected height in the sleeve 34. The pin 63 is extendable through the aperture 42 in the sleeve 34 and the respective hole 62 in the first member 52 of the yoke 44 that is aligned with the aperture 42 for retaining the yoke 44 at the selected height.

A plurality of stakes 64 is provided and each of the stakes 64 is insertable through the base 12 to engage the horizontal support surface 14. In this way the plurality of stakes 64 inhibit the base 12 from moving on the horizontal support surface 14 when the game animal 48 is positioned on the yoke 44. Each of the stakes 64 has a handle 66 that is oriented transverse with a rod 68. The rod 68 associated with each of the stakes 64 is insertable through a respective one of the holes 24 in a respective one of the outward members 18 of the base 12 having the handle 66 associated with each of the stakes 64 resting against the top surface 20 of the respective outward member 18.

A pair of adjustable rods 70 is provided and each of the adjustable rods 70 has a slidably adjustable length. Each of the adjustable rods 70 can be positioned against the game animal 48 for propping the game animal 48 in a preferred orientation. Each of the adjustable rods 70 has a first portion 72 that slidably receives a second portion 74, and the first portion 72 of each of the adjustable rods 70 has a plurality of openings 76 extending therethrough. The openings 76 are distributed along a substantial length of the first portion 72 of each of the adjustable rods 70. The second portion 74 of each of the adjustable rods 70 has a lock 78 that is movably integrated therein, and the lock 78 on the second portion 74 of each of the adjustable rods 70 releasably engages a respective opening 76 in the first portion 72 for retaining the adjustable rods 70 at a selected length.

In use, the base 12 is positioned on the horizontal support surface 14 and each of the stakes 64 is driven through the base 12 to secure the base 12. The sleeve 34 is inserted into the receiver 30 and the yoke 44 is inserted into the sleeve 34. The yoke 44 is positioned at a desired height and the pin 63 is extended through the sleeve 34 and the yoke 44 to retain the yoke 44 at the desired height. In this way the neck 46 of the game animal 48 can be positioned in the yoke 44 for positioning the game animal 48 in a preferred orientation for taxidermy. Additionally, each of the adjustable rods 70 can be positioned against the game animal 48 for propping the game animal 48 in a preferred orientation. Additionally, the yoke 44, the sleeve 34 and the base 12 can be broken down for transportation or storage.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable game stand assembly for propping up a game animal for the purposes of taxidermy, said assembly comprising:

a base being positionable on a horizontal support surface;

a receiver being coupled to and extending upwardly from said base;

a sleeve being insertable into said receiver;

a yoke being insertable into said sleeve thereby facilitating said yoke to be vertically oriented when said base is positioned on the horizontal support surface wherein said yoke is configured to have a neck of a game animal positioned therein thereby facilitating the game animal's head to be positioned in a preferred orientation for taxidermy;

a pin being insertable through said sleeve and engaging said yoke to retain said yoke at a selected height in said sleeve, said pin being extendable through said aperture in said sleeve and said respective hole in said first member of said yoke that is aligned with said aperture for retaining said yoke at said selected height;

a plurality of stakes, each of said stakes being insertable through said base to engage the horizontal support surface wherein said plurality of stakes is configured to inhibit said base from moving on the horizontal support surface when the game animal is positioned on said yoke; and a pair of adjustable rods, each of said adjustable rods having a slidably adjustable length wherein each of said adjustable rods is configured to be positioned against the game animal for propping the game animal in a preferred orientation.

2. The assembly according to claim 1, wherein said base comprises a central member extending between a pair of outward members, said central member being oriented perpendicular to each of said outward members, said central member being centrally positioned along each of said outward members.

3. The assembly according to claim 2, wherein each of said outward members and said central member has a top surface and a bottom surface, each of said outward members having a pair of holes each extending through said top surface and said bottom surface of said outward members, each of said holes being positioned adjacent to a respective one of a first end and a second end of a respective one of said outward members.

4. The assembly according to claim 3, wherein said receiver is positioned on said top surface of said central member, said receiver being centrally positioned on said central member, said receiver having a distal end with respect to said top surface, said distal end being open.

5. The assembly according to claim 4, wherein said sleeve has a first end, a second end and an outer wall extending therebetween, said outer wall having an aperture extending through said outer wall, said aperture being positioned adjacent to said first end, said second end being insertable into said distal end of said receiver having said sleeve being vertically oriented.

6. The assembly according to claim 1, wherein said yoke has a first member and a pair of second members each forking away from said first member, each of said second members having a distal end with respect to said first member, said first member having a distal end with respect to each of said second members, each of said second members having a sequence of bends thereon being distributed between said first member and said distal end of said second members such that said yoke has a Y-shape.

7. The assembly according to claim 6, wherein said first member has a plurality of holes each extending through said first member, said holes being spaced apart from each other and being distributed between said pair of second members and said distal end of said first member.

8. The assembly according to claim 7, wherein:
said sleeve has a first end, a second end and an outer wall extending therebetween, said outer wall having an aperture extending through said outer wall, said aperture being positioned adjacent to said first end; and
said first member being insertable into said first end of said sleeve, said yoke being positionable to align a respective one of said holes with said aperture in said outer wall of said sleeve for adjusting a height of said yoke wherein said yoke is configured to accommodate a variety of sizes of game animals.

9. The assembly according to claim 3, wherein each of said stakes has a handle being oriented transverse with a rod, said rod associated with each of said stakes being insertable through a respective one of said holes in a respective one of said outwardly members of said base having said handle associated with each of said stakes resting against said top surface of said respective outward member.

10. The assembly according to claim 1, wherein each of said adjustable rods has a first portion slidably receiving a second portion, said first portion of each of said adjustable rods having a plurality of openings extending therethrough, said openings being distributed along a substantial length of said first portion of each of said adjustable rods.

11. The assembly according to claim 10, wherein said second portion of each of said rods has a lock being movably integrated therein, said lock on said second portion of each of said adjustable rods releasably engaging a respective opening in said first portion for retaining said adjustable rods at a selected length.

12. A portable game stand assembly for propping up a game animal for the purposes of taxidermy, said assembly comprising:
a base being positionable on a horizontal support surface, said base comprising a central member extending between a pair of outward members, said central member being oriented perpendicular to each of said outward members, said central member being centrally positioned along each of said outward members, each of said outward members and said central member having a top surface and a bottom surface, each of said outward members having a pair of holes each extending through said top surface and said bottom surface of said outward members, each of said holes being positioned adjacent to a respective one of a first end and a second end of a respective one of said outward members;
a receiver being coupled to and extending upwardly from said base, said receiver being positioned on said top surface of said central member, said receiver being centrally positioned on said central member, said receiver having a distal end with respect to said top surface, said distal end being open;
a sleeve being insertable into said receiver, said sleeve having a first end, a second end and an outer wall extending therebetween, said outer wall having an aperture extending through said outer wall, said aperture being positioned adjacent to said first end, said second end being insertable into said distal end of said receiver having said sleeve being vertically oriented;
a yoke being insertable into said sleeve thereby facilitating said yoke to be vertically oriented when said base is positioned on the horizontal support surface wherein said yoke is configured to have a neck of a game animal positioned therein thereby facilitating the game animal's head to be positioned in a preferred orientation for taxidermy, said yoke having a first member and a pair of second members each forking away from said first member, each of said second members having a distal end with respect to said first member, said first member having a distal end with respect to each of said second members, each of said second members having a sequence of bends thereon being distributed between said first member and said distal end of said second members such that said yoke has a Y-shape, said first member having a plurality of holes each extending through said first member, said holes being spaced apart from each other and being distributed between said pair of second members and said distal end of said first member, said first member being insertable into said first end of said sleeve, said yoke being positionable to align a respective one of said holes with said aperture in said outer wall of said sleeve for adjusting a height of said yoke wherein said yoke is configured to accommodate a variety of sizes of game animals;
a pin being insertable through said sleeve and engaging said yoke to retain said yoke at a selected height in said sleeve, said pin being extendable through said aperture in said sleeve and said respective hole in said first member of said yoke that is aligned with said aperture for retaining said yoke at said selected height;

a plurality of stakes, each of said stakes being insertable through said base to engage the horizontal support surface wherein said plurality of stakes is configured to inhibit said base from moving on the horizontal support surface when the game animal is positioned on said yoke, each of said stakes having a handle being oriented transverse with a rod, said rod associated with each of said stakes being insertable through a respective one of said holes in a respective one of said outwardly members of said base having said handle associated with each of said stakes resting against said top surface of said respective outward member; and a pair of adjustable rods, each of said adjustable rods having a slidably adjustable length wherein each of said adjustable rods is configured to be positioned against the game animal for propping the game animal in a preferred orientation, each of said adjustable rods having a first portion slidably receiving a second portion, said first portion of each of said adjustable rods having a plurality of openings extending therethrough, said openings being distributed along a substantial length of said first portion of each of said adjustable rods, said second portion of each of said rods having a lock being movably integrated therein, said lock on said second portion of each of said adjustable rods releasably engaging a respective opening in said first portion for retaining said adjustable rods at a selected length.

* * * * *